United States Patent
Finn et al.

(10) Patent No.: US 7,894,342 B2
(45) Date of Patent: Feb. 22, 2011

(54) EFFICIENT PRUNING OF VIRTUAL SERVICES IN BRIDGED COMPUTER NETWORKS

(75) Inventors: Norman W. Finn, Livermore, CA (US); Munish Mehta, Fremont, CA (US); Yibin Yang, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 14 days.

(21) Appl. No.: 12/394,924

(22) Filed: Feb. 27, 2009

(65) Prior Publication Data

US 2010/0220730 A1  Sep. 2, 2010

(51) Int. Cl.
*G01R 31/08* (2006.01)
*G06F 15/173* (2006.01)

(52) U.S. Cl. .................... 370/230.1; 709/238
(58) Field of Classification Search .......... None
See application file for complete search history.

(56) References Cited

U.S. PATENT DOCUMENTS

| | | | |
|---|---|---|---|
| 6,304,575 B1 | 10/2001 | Carroll et al. | |
| 6,333,931 B1 | 12/2001 | LaPier et al. | |
| 6,385,203 B2 | 5/2002 | McHale et al. | |
| 6,445,715 B1 | 9/2002 | Annaamalai et al. | |
| 6,515,963 B1 | 2/2003 | Bechtolsheim et al. | |
| 6,636,499 B1 | 10/2003 | Dowling | |
| 6,898,189 B1 | 5/2005 | Di Benedetto et al. | |
| 6,937,576 B1 | 8/2005 | Di Benedetto et al. | |
| 6,976,088 B1 | 12/2005 | Gai et al. | |
| 7,061,858 B1 | 6/2006 | Di Benedetto et al. | |
| 7,061,875 B1 | 6/2006 | Portolani et al. | |
| 7,177,946 B1 | 2/2007 | Kaluve et al. | |
| 7,180,899 B2 | 2/2007 | De Silva et al. | |
| 7,268,690 B2 | 9/2007 | Nguyen et al. | |
| 7,292,581 B2 | 11/2007 | Finn | |
| 7,293,080 B1 | 11/2007 | Clemm et al. | |
| 7,447,147 B2 | 11/2008 | Nguyen et al. | |
| 7,460,492 B2 | 12/2008 | Portolani et al. | |
| 7,466,710 B1 | 12/2008 | Clemm et al. | |
| 7,471,674 B2 | 12/2008 | Dantu et al. | |
| 7,480,258 B1 | 1/2009 | Shuen et al. | |
| 2003/0079040 A1* | 4/2003 | Jain et al. | 709/238 |
| 2003/0165140 A1* | 9/2003 | Tang et al. | 370/393 |
| 2005/0220054 A1* | 10/2005 | Meier et al. | 370/331 |
| 2006/0007867 A1* | 1/2006 | Elie-Dit-Cosaque et al. | 370/241.1 |
| 2006/0245436 A1 | 11/2006 | Sajassi | |
| 2007/0110024 A1 | 5/2007 | Meier | |
| 2007/0211737 A1* | 9/2007 | Rose et al. | 370/401 |

(Continued)

*Primary Examiner*—Hong Cho
*Assistant Examiner*—Eunsook Choi
(74) *Attorney, Agent, or Firm*—Cesari and McKenna, LLP

(57) ABSTRACT

In one embodiment, a bridge in a computer network may execute a spanning tree protocol (STP) for network topology and a registration protocol for traffic control of virtual connections (e.g., EVCs) at the bridge. For any gateway ports of the bridge inter-connected with a provider network, the bridge may generate "fake" received registration protocol join messages for a particular virtual connection at the gateway port. The bridge may then either i) propagate the join messages, in response to the gateway port being in a forwarding state according to the STP, on other forwarding ports of the bridge, or ii) in response to the gateway port not being in a forwarding state, block propagation of the join messages to other ports of the bridge.

20 Claims, 7 Drawing Sheets

U.S. PATENT DOCUMENTS

| | | | |
|---|---|---|---|
| 2007/0263554 A1* | 11/2007 | Finn | 370/256 |
| 2007/0263640 A1* | 11/2007 | Finn | 370/401 |
| 2008/0175239 A1* | 7/2008 | Sistanizadeh et al. | 370/390 |
| 2008/0239957 A1* | 10/2008 | Tokura et al. | 370/235 |

* cited by examiner

EFFICIENT PRUNING OF VIRTUAL SERVICES IN BRIDGED COMPUTER NETWORKS

TECHNICAL FIELD

The present disclosure relates generally to computer networks, and, more particularly, to pruning virtual services in bridged computer networks.

BACKGROUND

Metro Ethernet networks are becoming the choice of service providers for aggregation networks, often using virtual services such as Ethernet virtual connections (EVCs) as a new infrastructure that scales beyond 4K (4096) virtual services. To improve network availability, EVCs are typically provisioned with multiple redundant paths through the networks. One problem with current protocols that attempt to control EVCs, however, is that even if a redundant path is inactive, EVC traffic still floods over it, wasting network bandwidth. For instance, current Virtual Local Area Network (VLAN) based pruning protocols such as MVRP (Multiple VLAN Registration Protocol) and VTP (VLAN or Virtual Trunking Protocol) do not solve this problem because EVC has a finer granularly beyond a single VLAN, and also supports more than 4K services.

Typically, aggregation networks are interconnected through backbone networks, for example, executing IEEE 802.1ah or Multi-Protocol Label Switching (MPLS) technologies. In a single aggregation network, multiple gateway switches (or gateway ports of a single switch) may be utilized to access the backbone network, which can provide redundancy and load balancing. In order to prevent loops and wasted bandwidth, an EVC generally takes only one gateway from the aggregation network to the backbone network, and paths to other gateways should be pruned (removed/blocked). Due to performance and administrative concerns, however, protocols used in the aggregation networks (e.g., their messages, or Bridge Protocol Data Units, "BPDUs") are not always allowed to tunnel/traverse through the backbone networks. Accordingly, it has generally been difficult (or not possible) to efficiently manage the selection of an active gateway for EVCs, as well as to converge EVC topology based on changing gateway status.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
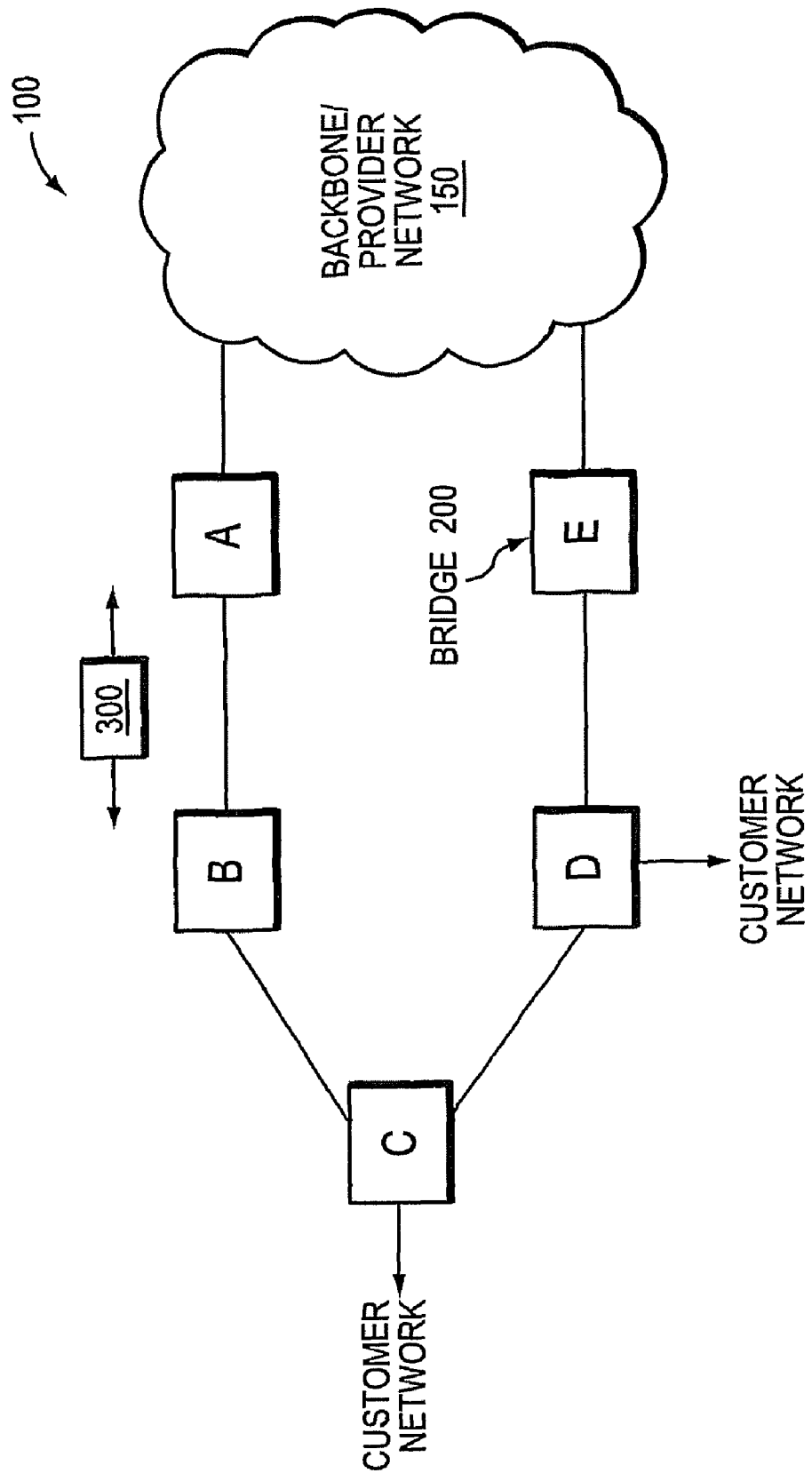
FIGS. 1A-B illustrate example computer networks (e.g., bridged networks)

According to embodiments of the disclosure, a bridge in a computer network may execute a spanning tree protocol (STP) for network topology and a registration protocol for traffic control of virtual connections (e.g., EVCs) at the bridge. For any gateway ports of the bridge interconnected with a provider network, the bridge may generate "fake" received registration protocol join messages for a particular virtual connection at the gateway port. The bridge may then either i) propagate the join messages, in response to the gateway port being in a forwarding state according to the STP, on other forwarding ports of the bridge, or ii) in response to the gateway port not being in a forwarding state, block propagation of the join messages to other ports of the bridge. In this manner, efficient pruning of virtual connections/services may be accomplished without tunneling the registration protocol through the provider network.

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge (or switch) may be used to provide a "bridging" (or "switching") function between two or more LANs. Typically, the bridge is a computer and includes a plurality of ports that are coupled to the LANs (also called "links"). Ports that are coupled to LANs that are, in turn, coupled to other bridges are generally referred to as a trunk ports, whereas ports used to couple bridges through LANs to end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the bridging function, Layer-2 bridges examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may re-assemble or convert received data frames from one LAN standard (e.g., Ethernet) to another (e.g. token ring). Thus, Layer-3 devices are often used to interconnect dissimilar subnetworks.

FIG. 1A is a schematic block diagram of an example computer network 100 illustratively comprising nodes/devices, such as bridges 200A-E interconnected by links as shown. In particular, bridges 200C and 200D (or, simply bridges "C" and "D") are interconnected with a customer network, while bridges A and E have gateway ports interconnected with a provider network 150 (e.g., an IEEE 802.1ah or MPLS backbone network, as will be understood by those skilled in the art). Illustratively, bridges A-E form an aggregation network (e.g., IEEE 802.1ad).

Figure 1B:
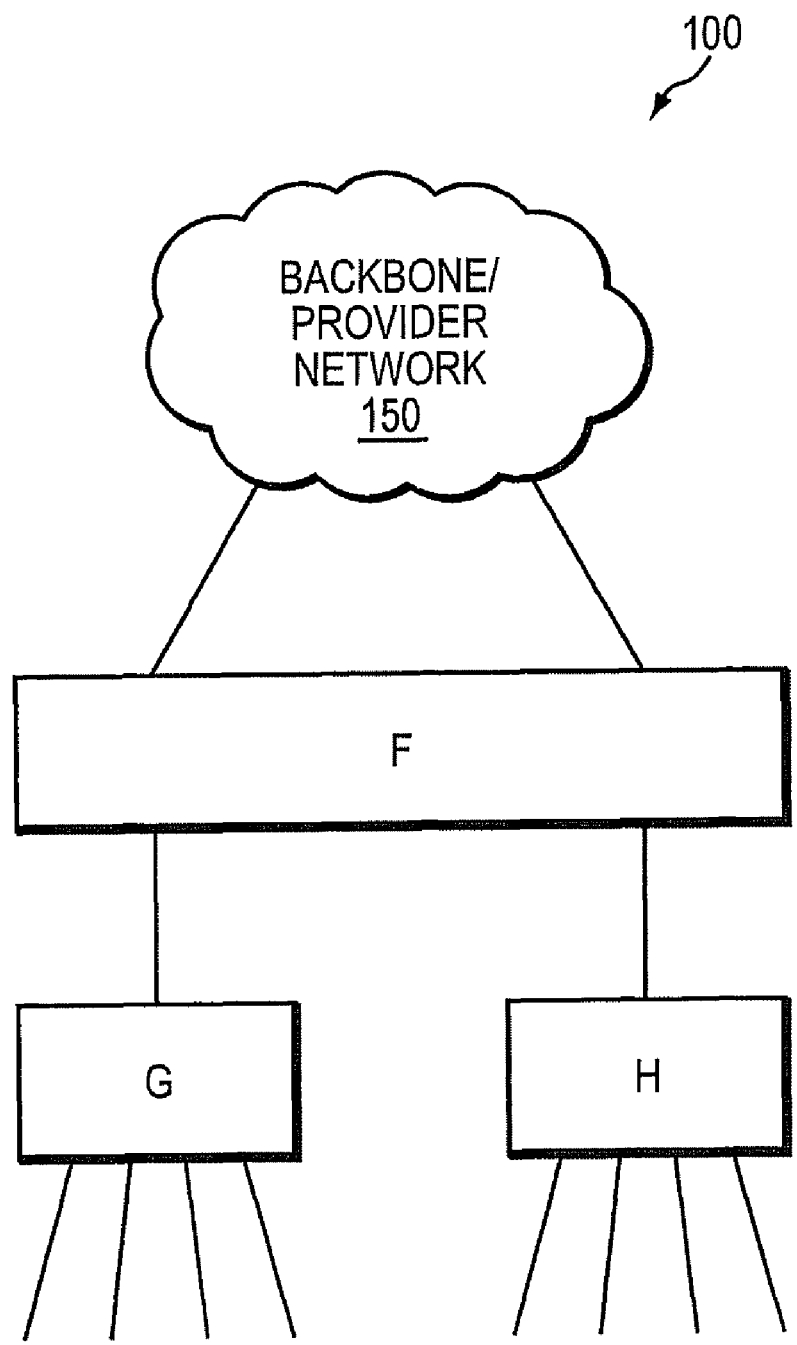

Since network 100 comprises bridges, and illustratively operates according to Layer-2, the network 100 may be referred to herein as a "bridged network" accordingly. Those skilled in the art will understand that any number of nodes, devices, links, etc. may be used in the computer network, and that the view shown herein is for simplicity. For example, while the network 100 of bridges is shown as a simple segment of a small number of bridges, the embodiments described herein may also be applicable to "chains" or "rings" of bridges, e.g., large numbers of bridges. Those skilled in the art will also understand that while the embodiments described herein are described generally, they may apply to any network. The computer (bridged) network 100 of FIG. 1 is meant for illustration purposes only and is not meant to limit the embodiments described herein. (Notably, FIG. 1B illustrates one such alternative, where a single bridge F has multiple gateway ports to provider network 150 to interconnect bridges G and H within the aggregation network, accordingly.)

Figure 2:
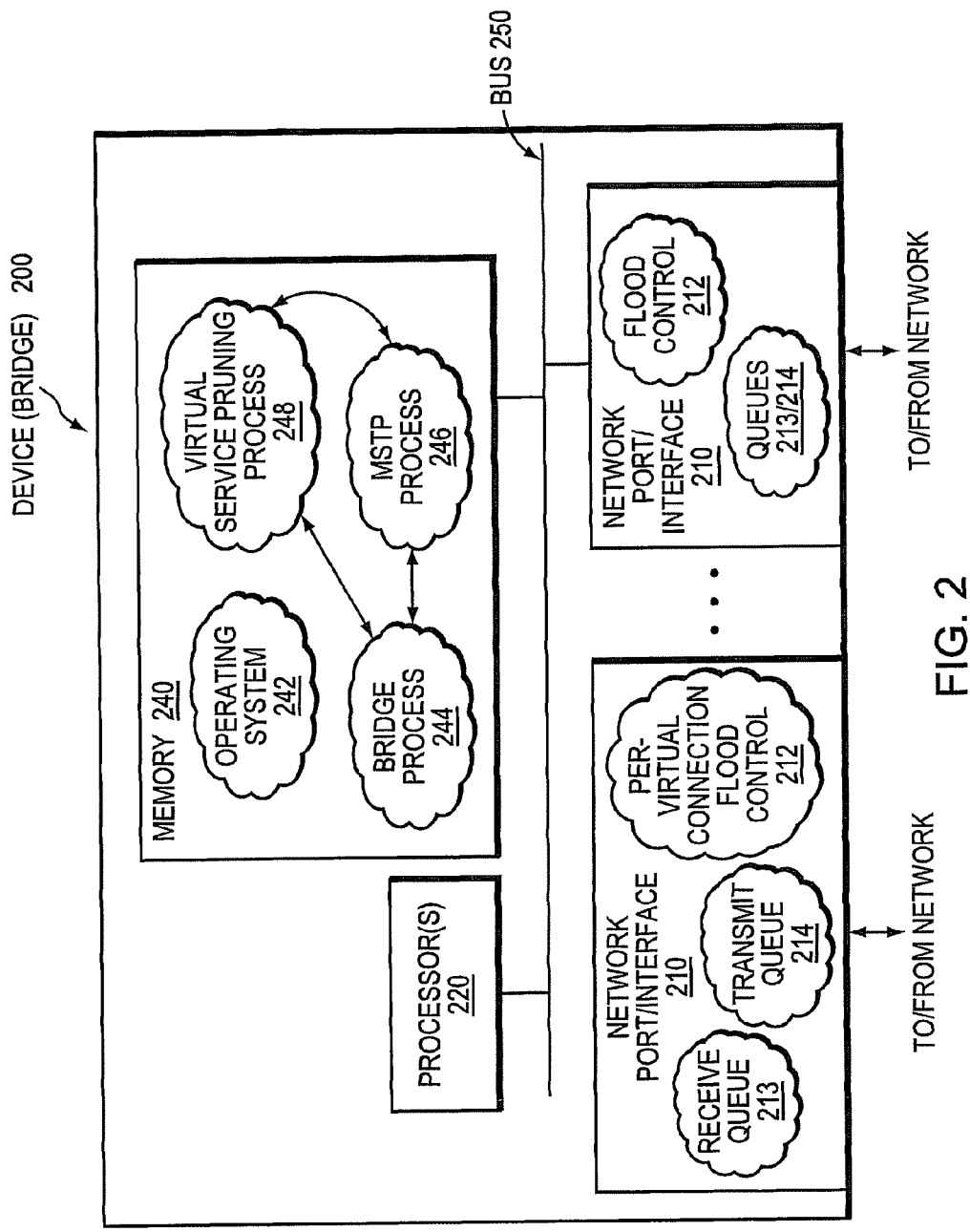
FIG. 2 illustrates an example network device/node (e.g., bridge)

FIG. 2 is a schematic block diagram of an example node/device 200 that may be advantageously used with one or more embodiments described herein, e.g., as a bridge. The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100, particularly on Layer-2. The network interfaces/ports may be configured to transmit and/or receive data (frames) using a variety of different communication protocols over physical links or wireless links, for instance with the use of queues (receive queue 213 and transmit queue 214) as will be understood by those skilled in the art. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack (not shown) that defines the functions performed by the data link and physical layers of a communications architecture. Further, as described herein, each port may be enabled with per-virtual-circuit flood control logic/circuitry 212.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an illustratively simplified "bridge process" 244, along with an illustrative multiple spanning tree protocol (MSTP) process 246 and a virtual service pruning process 248, as described herein. It will be apparent to those skilled in the art that other types of processors and memory, including various computer-readable media, may be used to store and execute program instructions pertaining to the inventive technique described herein.

Bridge process 244 contains computer executable instructions executed by the processor(s) 220 to perform various functions relating to bridges in general, as may be appreciated by those skilled in the art. For instance, a communication process/service of bridge process 244 may perform functions provided by one or more communication protocols, such as various switching/bridging protocols. These functions may be configured to manage switching databases (e.g., spanning tree instances), filtering databases (FDBs), or forwarding information databases (FIBs) containing, e.g., data used to make switching/forwarding decisions. In particular, as part of communication process/services, a spanning tree process may execute to perform functions provided by one or more spanning tree protocols (STPs), such as the known Multiple STP (MSTP) through sub-process 246, in addition to the novel techniques described herein. Illustratively, MSTP may be employed on the network devices (bridges) to establish and maintain one or more spanning tree instances, converging the network in response to topology changes. In addition, the known Multiple Registration Protocol (MRP), as defined by IEEE Std. 802.1ak (originally called GARP), may be used to allow registration and propagation of attributes within a network.

As noted above, Metro Ethernet networks are often used for aggregation networks with Ethernet virtual connections (EVCs) as a new infrastructure to scale beyond 4K virtual services. For the purpose of improving network availability, EVCs are typically provisioned with multiple redundant paths. The problem is that even if a path is inactive, EVC traffic still floods over it, which wastes network bandwidth. Current VLAN based pruning protocols (e.g., MVRP and VTP) do not solve this problem because, among other reasons, EVCs have a finer granularly beyond a single VLAN. For example, EVCs support more than 4K services within an aggregation network (e.g., double-tagged 12-bit IEEE 802.1Q 12-bit identifiers, or a single IEEE 802.1ah 24-bit identifier).

Aggregation networks are typically interconnected through backbone networks 150 based on IEEE 802.1ah or MPLS technology, where each aggregation network provides multiple gateways (bridges/ports) to access the backbone for redundancy and load balancing. As noted, however, each EVC can only utilize one gateway to the backbone network at a time, and other redundant paths should be blocked or "pruned" to prevent wasted bandwidth. Due to performance and administrative concerns, however, it is not always possible to tunnel BPDUs from the aggregation networks through the backbone networks. Accordingly, a problem exists in the absence of tunneled BPDUs regarding how to select an EVC's path to an active gateway, and when the active gateway goes down, how to converge to a new path to another gateway. (Notably, as may be appreciated by those skilled in the art, the known ITU-T and G.8031 protocols perform ring protection techniques, but the ring can only "break" in one place, and there is no temporary loop prevention during the time the protocols converge to a new topology.)

Efficient Virtual Service Pruning

Figure 3:
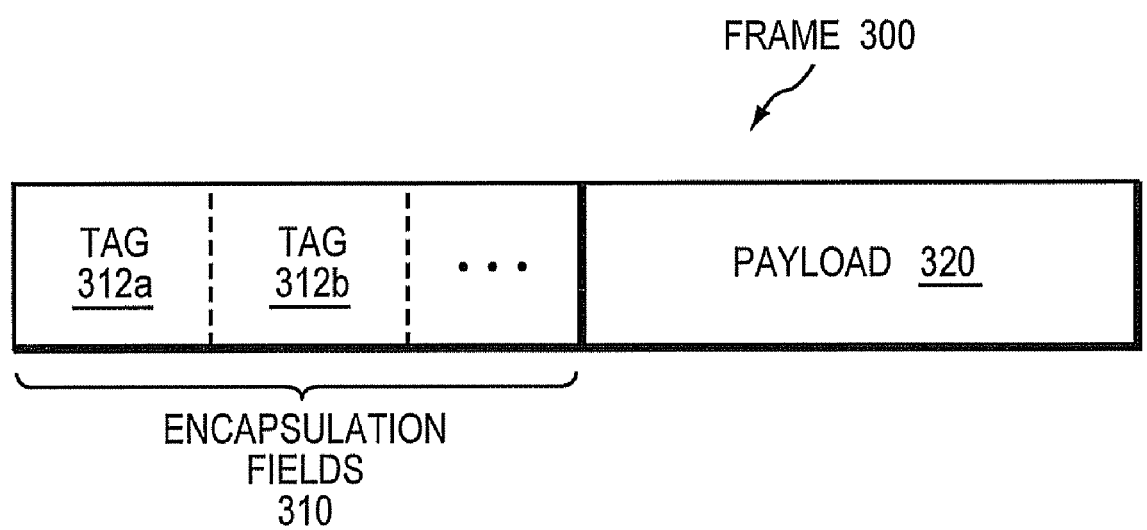
FIG. 3 illustrates an example frame format.

According to embodiments of the disclosure, EVC virtual services, which generally are identified by a string, are now identified by a numerical identification (e.g., an "EVC number"), which may be distributed throughout the network using various known protocols, such as VTP (or VTP3). Illustratively, the EVC number may be a "double-tagged" identifier (two 12-bit identifier fields) or a single identifier (e.g., a 14-bit or 24-bit identifier), so long as the capability exists to uniquely identify more than 4K (4096) services (e.g., up to 16 million). For example, FIG. 3 illustrates an example frame 300 showing encapsulation fields 310 (e.g., two virtual connection tags 312*a/b*) and a payload 320, as will be appreciated by those skilled in the art.

Specifically, for efficient virtual service pruning, a registration protocol, such as the MRP or, illustratively, the Multiple I-service Registration Protocol (MIRP), may be extended to utilize EVC numbers as registerable attributes, as will be appreciated by those skilled in the art (e.g., as opposed to an I-Service ID that is registered through MIRP). In accordance with embodiments herein, the reception of registration protocol join messages (e.g., MRP PDUS) may be faked on gateway ports connecting to the backbone/provider network 150 in the absence of BPDU tunneling, as mentioned above. As such, the techniques described below also provide for a per-port, per-virtual-service (per-EVC) flood control.

Illustratively, the techniques described herein may be performed by hardware, software, and/or firmware, such as in accordance with a virtual service pruning process 248, in conjunction with MSTP process 246 and bridging process 244. For instance, these processes may incorporate various registration protocol processes as described herein, and may operate in accordance with certain conventional protocols (e.g., MIRP, MSTP, etc.) and in accordance with the techniques described herein (e.g., enhancements to the protocols).

Figure 4:
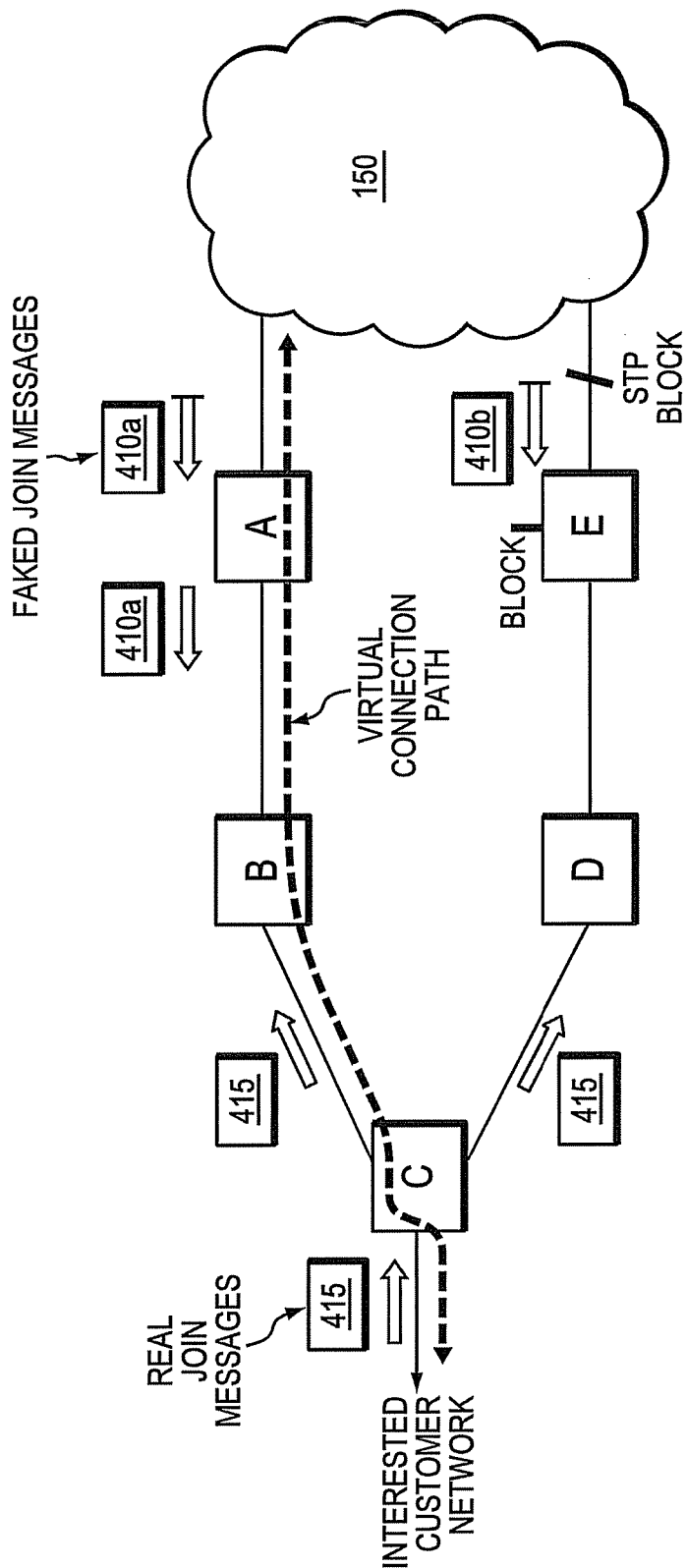
FIG. 4 illustrates an example propagation of registration messages.

Operationally, the network may execute an STP for network topology, for example, including the known Layer-2 Gateway Protocol (L2GP). Referring to FIG. 4 (the computer network of FIG. 1A), the aggregation network shows bridges A and E having gateway ports to backbone/provider network 150. Also, a customer facing port (e.g., UNI port) may be found on bridges C and D for customer connection. For ease of discussion, assume that the UNI port on bridge C (e.g., not D) is provisioned for a particular EVC, and that there are two paths for this EVC, namely C-B-A, and C-D-E, to reach a gateway. To prevent loops and/or wasted traffic, a gateway protocol (e.g., L2GP) runs on both gateways A and E, which illustratively unblocks bridge A's port to backbone but blocks that of bridge E.

In this topology, the EVC path from C-E should be pruned (by the registration protocol) because bridge E does not provide backbone access. However, if bridge A's access to the backbone fails and bridge E's port to the backbone gets unblocked by STP (e.g., L2GP), the EVC path from C-D should be unpruned and the path C-A should be pruned instead. As noted, this operation may be required to operate has to be achieved without tunneling of registration protocol BPDUs from the aggregation network(s) on other sides of the backbone.

In order to accommodate, the techniques herein define the use of unique numerical IDs for each EVC, which are mapped (per port) one-to-one with EVC IDs that are strings used network-wide for EVC identification (e.g., distributed using VTP, NMS, or other protocol). A registration protocol, such as MRP (or converted MIRP), may execute in the aggregation network for EVC pruning. Unlike conventional MIRP, however, the EVC number is used as the registered attribute for traffic control of EVC (virtual connections) paths/traffic, for example, managing per-EVC state machines per port to indicate whether a particular virtual connection is desired and/or available.

According to the embodiments described herein, for each virtual service/connection (e.g., each EVC), "real" registration protocol join messages 415 are initiated from bridges/switches on which customer-facing ports (e.g., UNI ports) are configured and active. That is, a bridge generates real join messages for registration with a particular virtual connection at ports of the bridge connected to a customer network interested in registering with that particular virtual connection. In addition, "fake" join messages 410 may be generated (or, said differently, faked to be received) on gateway ports connecting to the backbone/provider network for each particular virtual connection (e.g., EVC). (Those skilled in the art will understand that a bridge may be manually configured with gateway ports, or the gateway ports may be dynamically determined using various gateway protocols.)

For instance, in the topology of FIG. 4, real join messages 415 for a particular EVC are sent from bridge C (due to the presence of a UNI port), and fake join messages are "received" by bridge A (410*a*) and bridge E (410*b*) on their respective ports connecting to the backbone network 150. Since the "fake" join messages are not actually received from the backbone network 150, each gateway bridge may fake receipt of the join messages by either inserting a join message directly into the receive queue 213 of the gateway port, or handling faked receipt at higher process layers (e.g., within main bridge process 244).

Based on conventional registration protocol operation (e.g., MRP, MVRP, MIRP, etc.), if a gateway port is in a forwarding state according to STP (e.g., L2GP), then the faked join messages will be propagated to other forwarding ports of the gateway bridge. For instance, bridge A is in a forwarding state, and therefore the faked join messages 410*a* are forwarded by bridge A on its other forwarding ports (thus reaching bridge C, completing the registered traffic control path for the particular EVC). On the other hand, if a gateway port is blocked by STP, the gateway bridge does not send any join messages out. For example, bridge E's gateway port is blocked, and thus faked join messaged 410*b* are also blocked. In this way, redundant paths from the customer networks (UNI ports) to non-gateways (per conventional operation) and gateways without backbone access will be pruned.

Figure 5:
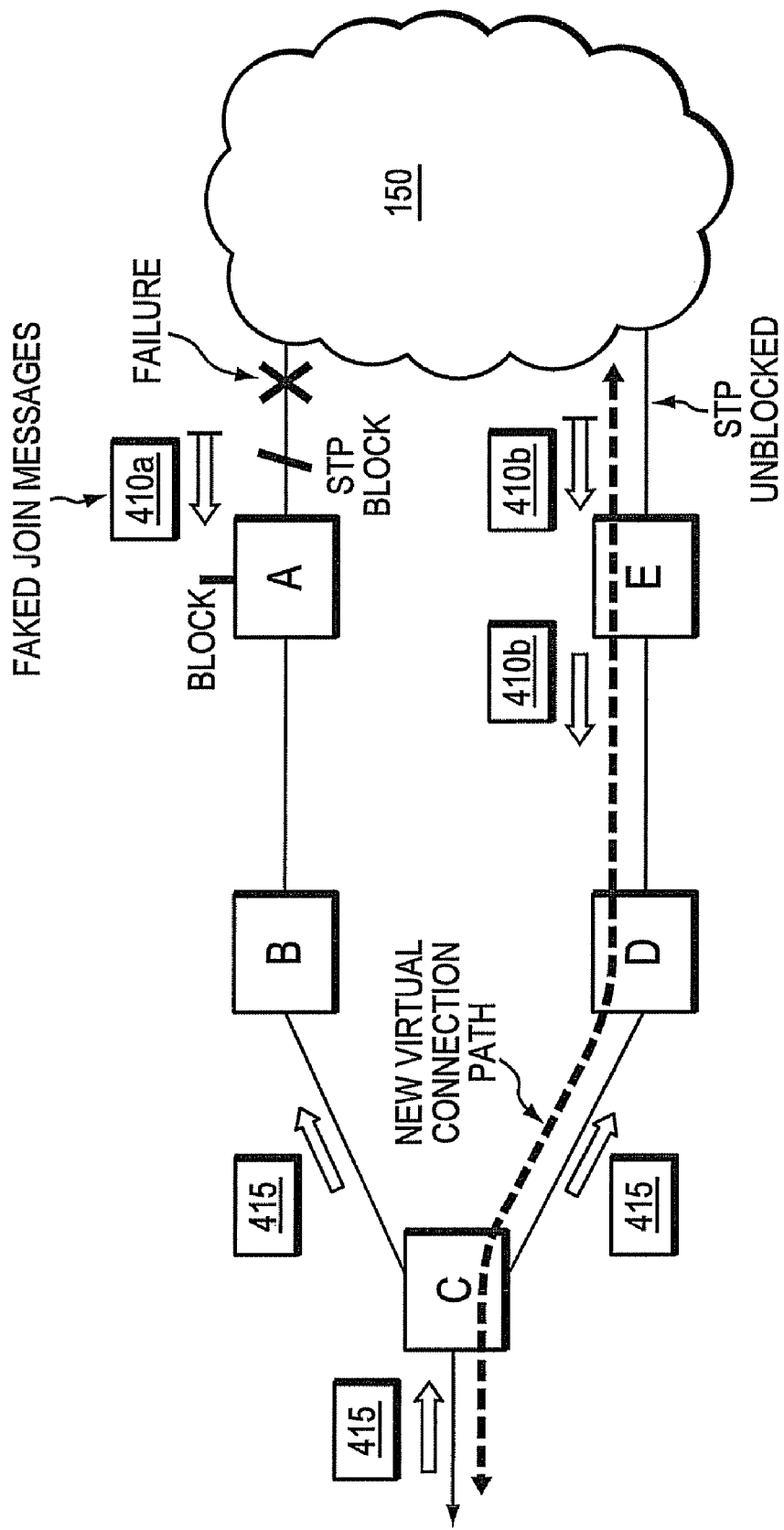
FIG. 5 illustrates another example propagation of registration messages.

During the normal course of network topology changes, bridge A may lose its connection to the backbone network (e.g., link/port failure or other cause). Typical Spanning Tree operation (e.g., L2GP) is designed to quickly converge the network topology to block bridge A's failed gateway port, and unblock bridge E's previously blocked port. As noted above, however, the change in STP state does not directly update the virtual connection state for traffic control. As such, the registration protocols faked join messages as described herein dynamically react to change traffic control of virtual connections (e.g., EVCs) in the network. For instance, as shown in FIG. 5, bridge A's gateway port is STP blocked and bridge E's gateway port is correspondingly unblocked. Accordingly, the faked join messages 410a of bridge A are no longer propagated by the registration protocol, thus pruning the virtual connection path from C-A. Further, the faked join messages 410b received on bridge E's gateway port will trigger propagation of the join messages out of bridge E's other (STP) forwarding ports, thus unpruning the virtual connection path from C-D, and allowing the redundant path to become active (quickly, without loops, without wasting bandwidth, and without tunneling the registration protocol through the backbone/provider network).

Notably, once a virtual connection (EVC) is pruned on a port (e.g., based on the EVC number carried in registration protocol join messages) per-port per-virtual-connection flooding scope control needs to be enforced in the data path. Accordingly, per-virtual-connection flood control logic 212 (e.g., hardware) may be utilized on bridge ports 210 (also referred to as EVC flooding prune logic or "EFPL"). Typically, logic 212 consists of a lookup table including a list of virtual connections and their corresponding flooding state (e.g., illustratively embodied as a flooding index and a bitmap of forwarding states). When a frame needs to be flooded on a virtual connection, the lookup table will be accessed (e.g., to locate the corresponding index) and the frame may be flooded only the virtual connections having active ports (e.g., according to the bitmap). In other words, when a virtual connection is registered on a particular port, the bridge sets a pruning state of the connection in the bitmap (one bit=one port) such that the virtual connections are either pruned or not pruned on the particular port (which is in addition to a particular instance having a corresponding MSTP state for the port, i.e., disabled, listening/blocking, learning, or forwarding).

Figure 6:
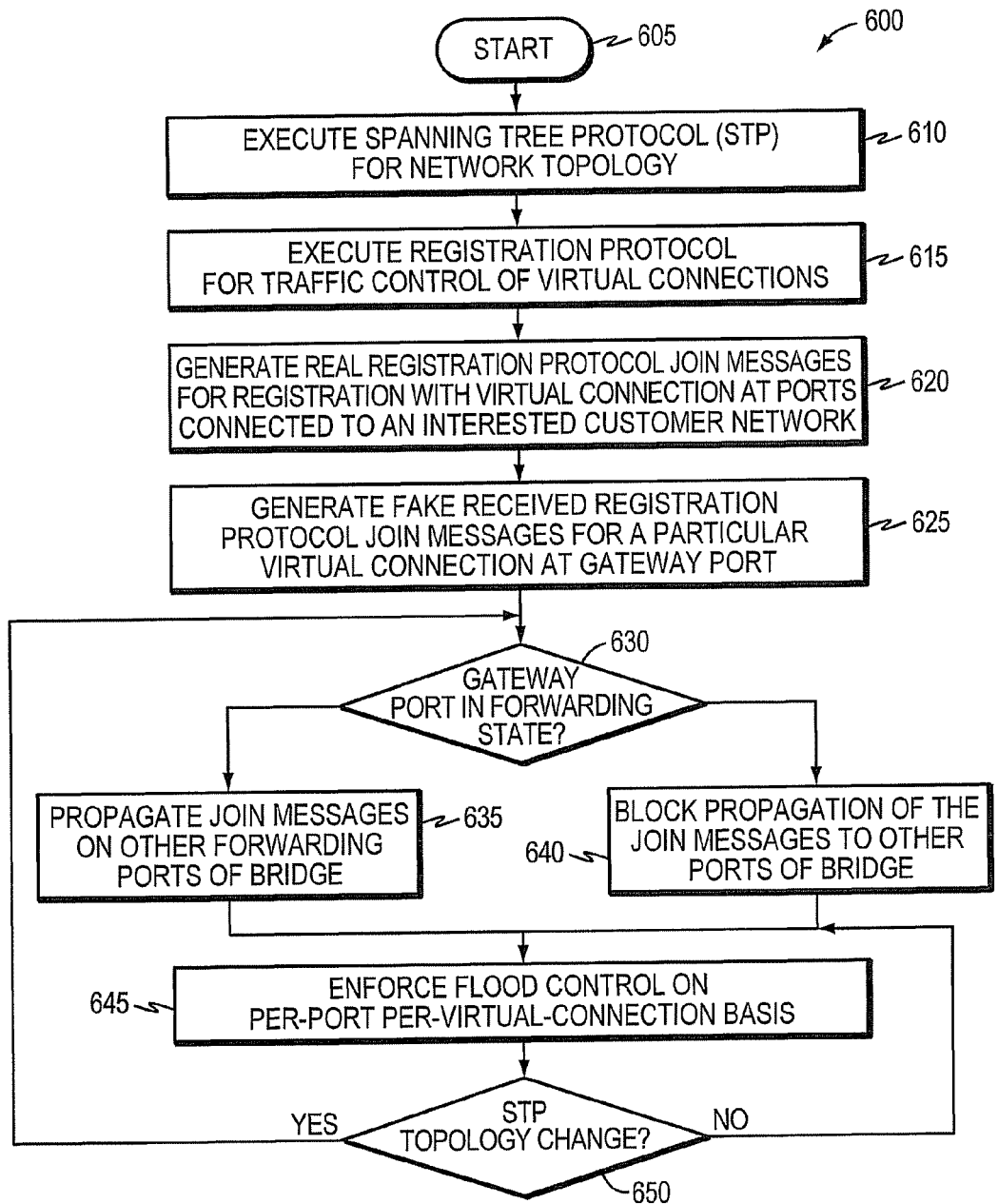
FIG. 6 illustrates an example procedure for efficiently pruning virtual services in a computer network.

FIG. 6 illustrates an example procedure for efficiently pruning virtual services in accordance with one or more embodiments described herein. The procedure 600 starts at step 605, and continues to step 610, where a bridge 200 (e.g., bridge E) executes an STP for network topology (e.g., MSTP 246). Also, in step 615, the bridge executes a registration protocol for traffic control of virtual connections (e.g. MIRP). As mentioned above, in the event any ports are connected to a customer network (e.g., a UNI port) interested in a particular virtual connection, then in step 620 the bridge may generate real registration protocol join messages 415 for registration with that virtual connection.

Further, as described in more detail above, in step 625 the bridge may generate fake received registration protocol join messages 410 for a particular virtual connection at a gateway port interconnected with a provider network. Accordingly, depending upon whether the gateway port is in a forwarding state (per STP) in step 630, the bridge may either propagate the join messages, if forwarding, on other forwarding ports in step 635, or otherwise block propagation of the join messages in step 640. Per-port per-virtual-connection flood control may then be enforced in step 645 based on the forwarding state of the virtual connections, until a topology change (per STP) occurs in step 650. At which time, the virtual connections are dynamically adjusted to match the topology change by returning to step 630, where the faked received join messages are either forwarded or blocked based on the new underlying topology.

Advantageously, the novel techniques described herein efficiently prune virtual services in a bridged computer network. By utilizing the virtual service (EVC) traffic control techniques described above, such as faked reception of join messages and perport per-service flood control, the novel techniques provide virtual service functionality and gateway redundancy in bridged networks. In particular, efficient virtual service state transitions occur in response to topology changes, thus preventing temporary loops or dropped traffic, notably without the need for tunneling the virtual service traffic control through a provider network. Also, the dynamic aspects of one or more embodiments described herein alleviate the need for cumbersome and inefficient manual configuration.

While there have been shown and described illustrative embodiments that efficiently prune virtual services in a bridged computer network, it is to be understood that various other adaptations and modifications may be made within the spirit and scope of the present invention. For example, the embodiments have been shown and described herein in relation to various protocols and messages, such as STP, MSTP, MRP, MIRP, etc. However, the embodiments of the invention in their broader sense are not so limited, and may, in fact, be used with any suitable protocols. Moreover, while references to Ethernet networks are made, the techniques may be applied to any suitable computer network and under any suitable management scheme.

In particular, the concept of simulating the receipt of fake join messages 410 from Layer-2 Gateway ports may also be applied to a Multiple VLAN Registration Protocol (MVRP) based customer network which is using a gateway protocol (e.g., L2GP) to connect to a backbone/provider network (i.e., where the virtual connections are embodied as VLANs). Accordingly, the techniques described above provide ability to prune VLANs to gateway ports which are blocked by STP (e.g., L2GP) and hence prevent un-necessary flooding.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   executing a spanning tree protocol (STP) for network topology at a bridge in a computer network;
   executing a registration protocol for traffic control of virtual connections at the bridge;
   generating, at a gateway port of the bridge interconnected with a provider network, fake received registration protocol join messages for a particular virtual connection at the gateway port;
   in response to the gateway port being in a forwarding state according to the STP, propagating the join messages on other forwarding ports of the bridge; and
   in response to the gateway port not being in a forwarding state, blocking propagation of the join messages to other ports of the bridge.

2. The method as in claim 1, further comprising:
   generating real registration protocol join messages for registration with a second virtual connection at ports of the bridge connected to a customer network interested in registering with the second virtual connection.

3. The method as in claim 1, further comprising:
enforcing per-port per-virtual-connection flood control at the bridge.

4. The method as in claim 1, further comprising:
in response to a topology change according to the STP, changing traffic control to the provider network based on the fake join messages by the registration protocol.

5. The method as in claim 1, further comprising:
dynamically determining whether a port of the bridge is a gateway port.

6. The method as in claim 1, wherein generating comprises:
inserting a join message into a receive queue at the bridge.

7. The method as in claim 1, further comprising:
utilizing a layer-2 gateway protocol (L2GP) within the STP.

8. The method as in claim 1, further comprising:
utilizing a multiple virtual local area network (VLAN) registration protocol (MVRP) in response to controlled traffic being defined by VLANs.

9. The method as in claim 1, further comprising:
utilizing a multiple I-service registration protocol (MIRP) in response to controlled traffic being defined by Ethernet Virtual Connections (EVCs).

10. An apparatus, comprising:
a plurality of network ports to communicate frames in a computer network;
a processor coupled to the network ports and adapted to execute one or more processes; and
a memory configured to store a virtual service pruning process executable by the processor, the virtual service pruning process when executed operable to:
execute a spanning tree protocol (STP) for network topology in the computer network;
execute a registration protocol for traffic control of virtual connections;
generate, at a gateway port of the ports interconnected with a provider network, fake received registration protocol join messages for a particular virtual connection at the gateway port;
propagate the join messages, in response to the gateway port being in a forwarding state according to the STP, on forwarding ports of the bridge; and
block propagation of the join messages to other ports of the bridge in response to the gateway port not being in a forwarding state.

11. The apparatus as in claim 10, wherein the virtual service pruning process when executed is further operable to:
generate real registration protocol join messages for registration with a second virtual connection at ports connected to a customer network interested in registering with the second virtual connection.

12. The apparatus as in claim 10, wherein each port is configured to enforce per-port per-virtual-connection flood control at the bridge.

13. The apparatus as in claim 10, wherein the virtual service pruning process when executed is further operable to:
change traffic control to the provider network based on the fake join messages by the registration protocol in response to a topology change according to the STP.

14. The apparatus as in claim 10, wherein the computer network is an aggregation network.

15. The apparatus as in claim 10, wherein the STP utilizes a layer-2 gateway protocol (L2GP).

16. The apparatus as in claim 10, wherein the registration protocol utilizes a multiple virtual local area network (VLAN) registration protocol (MVRP) in response to the controlled traffic being defined by VLANs.

17. The apparatus as in claim 10, wherein the registration protocol utilizes a multiple I-service registration protocol (MIRP) in response to the controlled traffic being defined by Ethernet Virtual Connections (EVCs).

18. A system, comprising:
a plurality of bridges in an aggregation computer network, each bridge configured to execute a spanning tree protocol (STP) for network topology and further configured to execute a registration protocol for traffic control of virtual connections;
at least one gateway bridge of the plurality of bridges, the gateway bridge having a gateway port interconnected with a provider network, the gateway bridge configured to generate fake received registration protocol join messages for a particular virtual connection at the gateway port, the gateway bridge further configured to i) propagate the join messages on other forwarding ports of the gateway bridge in response to the gateway port being in a forwarding state according to the STP, and ii) block propagation of the join messages to other ports of the gateway bridge in response to the gateway port not being in a forwarding state.

19. The system as in claim 18, wherein each port is configured to enforce per-port per-virtual-connection flood control.

20. The system as in claim 18, wherein the gateway bridge is configured to change traffic control to the provider network based on the fake join messages by the registration protocol in response to a topology change according to the STP.

\* \* \* \* \*